T. SCANTLIN.
Evaporator for Saccharine Liquids.
No. 162,696. Patented April 27, 1875.
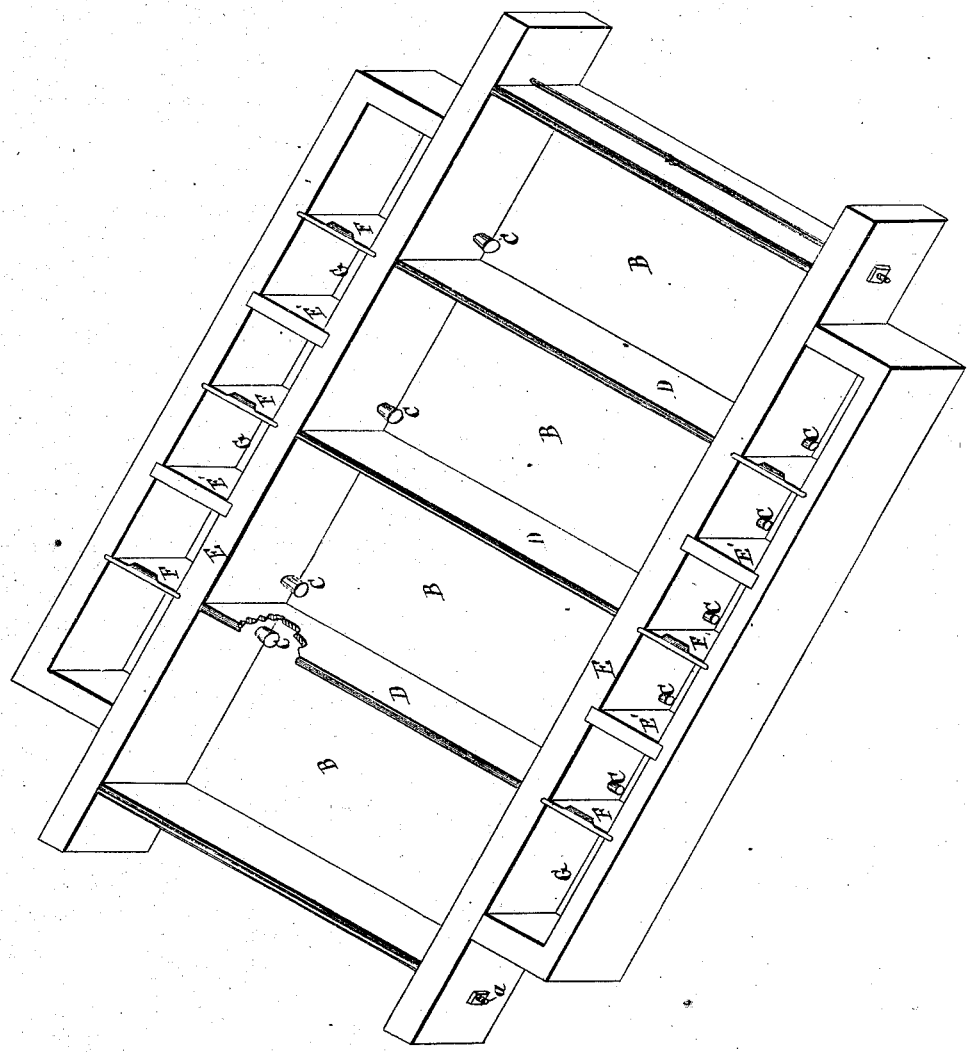
WITNESSES:
INVENTOR: Thomas Scantlin
BY
ATTORNEYS.

UNITED STATES PATENT OFFICE.

THOMAS SCANTLIN, OF EVANSVILLE, INDIANA.

IMPROVEMENT IN EVAPORATORS FOR SACCHARINE LIQUIDS.

Specification forming part of Letters Patent No. 162,696, dated April 27, 1875; application filed March 5, 1875.

To all whom it may concern:

Be it known that I, THOMAS SCANTLIN, of Evansville, in the county of Vanderburgh and State of Indiana, have invented a new and useful Improvement in Evaporators for Saccharine Liquids; and I do hereby declare that the following is a full, clear, and exact description of the same, reference being had to the accompanying drawing forming a part of this specification.

The primary objects of this invention are, first, to construct an evaporator consisting of a series of pans, all communicating one with another, without the use of solder or rivets; and, second, to provide for a continuous side passage, by which one pan of the series may be made at will to communicate with any one or more of the series, whether adjacent or not. To these ends the evaporator is composed of a series of metal pans and communicating open side passages or channels, the latter being provided with sliding valves, stoppers, and plugs, as hereinafter described, so that the liquid may be conducted from any pan of the series to an adjacent one, or past an adjacent one to another which is remote in the series, and thereby the contents of the several pans may be kept separate or commingled more or less, as required, or according as the heat varies in intensity in different parts of the furnace. The invention also relates to inserting the ends of the pans in grooves or kerfs in the wooden side pieces, and to other details of construction, as hereinafter described.

The drawing shows a perspective view of my improved evaporator.

The pans B are formed of sheet metal, and their adjacent sides, which form the partitions D, are united at the top by an ordinary lap-joint, while their ends are inserted in kerfs or grooves cut in the sides of the wooden pieces E. The pans B and pieces E are held together by screw-rods $a$; hence, neither rivets nor solder are used in the construction of the evaporator. This reduces its cost to a minimum, prevents leaking, burning out, and melting of solder, and obviates other obvious and well-known defects of other evaporators of this class. The open channels or passages G extend along the sides of pieces E and across the ends of the pans, so that instead of different cups joining adjacent pans, as heretofore, I have continuous channels, which furnish communication not only between any one pan and the adjacent one, but between it and any other farther along in the battery, and so that the juice may be conducted from a pan past another, and on to a third, which is remote in the series. As the means of effecting this operation I employ the plugs C, which close the holes in the ends of the pans, and the stoppers E' and slide-valves F in the side passages G. A stopper is placed in the passage G, between the holes in each pan, and a slide-valve, F, between the holes of adjacent pans, or directly opposite the ends of partitions D. I employ two plugs at each end and near each corner of each pan, so that in transferring the juice from pan to pan in either direction, the juice can be made to flow over every part of the pan through which it passes by withdrawing or closing the plugs, as may be desired, to admit or shut off the juice at any side or end of the pan.

When the fire is too hot under one of the pans, or the pan is too full, its contents may be allowed to intermingle with those of another remote in the series, and which is cooler, or has a less quantity of juice, by drawing the plugs C in the corresponding ends of said pans and raising or removing the stoppers E' and valves F in the connecting-channel G. The juice will then flow into the channel from each pan, and the hottest pans will be supplied from the cooler ones.

It is evident that in this operation the plugs C in the ends of the intermediate pans are not removed, so that their contents are kept separate, as at first. It is equally apparent, however, that all the plugs C of the several pans may be withdrawn, thus allowing the contents of all to mingle in and through the side passages G.

When one of the valves F in either channel G is removed, and the adjacent plugs C withdrawn, the contents of the two adjacent pans commingle, the stopper E' preventing the juice flowing on to another pan in the series.

In the beginning of the evaporating process it is necessary to remove all the plugs and slide-valves, so that there may be free communication between all the pans, and the evaporator being level on the furnace, each pan is filled to the top. The pan over the hottest part of the fire must be skimmed first, and the others in succession, the coolest last.

It is preferable in the initiatory stage to dip or draw out the juice from the hottest pan after all have been skimmed, and tranfer it to the other pans, as they boil down. Afterward, the coolest pans are again skimmed, and the juice admitted to the hottest ones, the coolest being supplied, as may be needed, from the reservoir, and the skimming continued.

With my evaporator, it is entirely practicable, with little labor, and without in any manner interfering with or dampening the fire, to fully control the process of evaporation, and to complete it in the briefest space of time, and thus produce an improved article of sirup or sugar, free from the burnt or scorched taste of the product of evaporation, in which the continuous shallow stream of juice is employed.

This evaporator may be heated by steam as well as over a coal or wood furnace, and may be successfully used in making salt.

Having thus described my invention, what I claim as new is—

1. In an evaporator, the continuous open outside channels G, in combination with the series of pans communicating therewith, respectively provided with the plugs and slide-valves, all combined as shown and described.

2. The combination of the wooden sides or pieces E, projecting beyond the sides of the furnace, and having grooves for the reception of the ends of the pans, the pans each provided with an opening in each end into the outside passages, the continuous outside passages, the lap-joint between the pans and the cross-rods, having heads and screw-nuts, all combined to form an evaporator composed of a series of pans communicating with each other, or with any one on the series, and the whole constructed without the use of solder or rivets, substantially as described.

THOMAS SCANTLIN.

Witnesses:
  CHAS. E. MARSH,
  JOHN J. MAILETT, Jr.